United States Patent [19]

Iwasa et al.

[11] Patent Number: 5,753,885
[45] Date of Patent: May 19, 1998

[54] POWDER MATERIALS FOR USE IN RESISTANCE WELDING ALUMINUM ARTICLES AND METHOD OF RESISTANCE WELDING ALUMINUM ARTICLES

[75] Inventors: Takashi Iwasa; Shinji Okabe; Mitsuru Noguchi; Takanori Yahaba, all of Wako, Japan

[73] Assignee: Honda Giken Kogyo Kabushiki Kaisha, Tokyo, Japan

[21] Appl. No.: 494,358

[22] Filed: Jun. 23, 1995

[30] Foreign Application Priority Data

Jun. 23, 1994 [JP] Japan ................................ 6-141922
Dec. 1, 1994 [JP] Japan ................................ 6-298608
Apr. 4, 1995 [JP] Japan ................................ 7-079046

[51] Int. Cl.$^6$ ............................ B23K 11/18; B23K 11/34
[52] U.S. Cl. .................. 219/118; 219/91.2; 219/85.14; 219/85.15
[58] Field of Search .................. 219/91.2, 92, 85.14, 219/85.15, 117.1, 118; 148/23, 24; 428/327

[56] References Cited

U.S. PATENT DOCUMENTS

| | | | |
|---|---|---|---|
| 2,726,308 | 12/1955 | Cinamon . | |
| 4,719,038 | 1/1988 | Sobata et al. | 252/511 |
| 5,030,816 | 7/1991 | Streker | 219/91.2 |
| 5,171,378 | 12/1992 | Kovarik et al. | 148/24 |
| 5,395,687 | 3/1995 | Totsuka et al. | 428/327 |

FOREIGN PATENT DOCUMENTS

| | | |
|---|---|---|
| 2226449 | 11/1974 | European Pat. Off. . |
| 0291277 | 11/1988 | European Pat. Off. . |
| 926926 | 10/1955 | Germany . |
| 54-441550 | 12/1979 | Japan . |
| 63-074634 | 4/1988 | Japan . |
| 63-278679 | 11/1988 | Japan . |
| 01-301241 | 12/1989 | Japan . |
| 04-219231 | 8/1992 | Japan . |
| 06-047863 | 2/1994 | Japan . |
| 2139538 | 11/1984 | United Kingdom . |

OTHER PUBLICATIONS

Translation of Abstract of JP 53128687 (English) Nov. 1978.
EPO Search Report, Oct. 1995.
Translation of exerpt of German Patent 926.926 Oct. 1953.
Brief explanation in English of JP63–278679, Nov. 1988.

*Primary Examiner*—Teresa J. Walberg
*Assistant Examiner*—J. Pelham
*Attorney, Agent, or Firm*—Lyon & Lyon LLP

[57] ABSTRACT

A powder material for use in resistance welding articles of aluminum comprises a mixture of 10–50% by weight of a liquid resin and the remaining proportion of a magnesium powder or a blend of magnesium and aluminum powders. Also a method of resistance welding articles of aluminum comprises the steps of preparing a pasty mixture by mixing in a predetermined amount of a liquid resin having a predetermined initial viscosity, a predetermined amount of a metal powder or a blend of metal and metal oxide powders, and inserting the pasty mixture between the mating weld surfaces of the aluminum articles. Only a small welding force and a low current will be required in producing a resistance weld connection between the aluminum articles with desired strength.

9 Claims, No Drawings

5,753,885

POWDER MATERIALS FOR USE IN RESISTANCE WELDING ALUMINUM ARTICLES AND METHOD OF RESISTANCE WELDING ALUMINUM ARTICLES

BACKGROUND OF THE INVENTION

1. Field of the Invention

The present invention relates generally to techniques of joining articles of aluminum (including aluminum alloys) by resistance welding. More specifically, the invention relates to techniques of joining articles of aluminum by resistance welding in which a weld connection with desired strength can be provided without requiring a high electrical current but with a relatively low electrical current and a minimum welding force

2. Description of the Related Art

In joining articles of aluminum by resistance welding, a relatively high current is required compared to articles of iron materials since aluminum has a high thermal conductivity and a low electrical resistivity.

Further, aluminum articles have strong oxide layers on their surfaces, which produce insulation effects, making it difficult to generate a stable conduction bridge. As a result, fused weld junctions are likely to become unstable in configuration to prevent this, a large welding force will be required.

Capacity to provide a high current and a large welding force required for resistance welding aluminum articles will lead to welding equipment installations large in scale, resulting in increased installation costs.

Normally, spot welding, a mode of resistance welding, is employed in producing a weld connection with respect to an aluminum body of an automotive vehicle.

However, spot welding sometimes causes the strength of a weld connection or junction to be less than 60% of that of a base material. As a solution to it, an area of the weld junction may be increased, in which instance the value of current needs to be increased significantly, or the number of weld connections needs to be increased.

To increase the value of current, corresponding welding equipment installations will be required, which are no doubt costly. If the number of weld connections is increased, welding operations will take a longer time, resulting in increased production costs.

Solutions to avoid those problems are disclosed, for example, in Japanese Patent Post-Exam Publication No. 54-41550 entitled "METHOD OF RESISTANCE WELDING ALUMINUM ARTICLES" (hereinafter referred to as Prior Art A), Japanese Patent Post-Exam Publication No. 59-26392 entitled "METHOD OF RESISTANCE WELDING OF ALUMINUM ARTICLES" (hereinafter referred to as Prior Art B) and Japanese Patent Laid-Open Publication No. 63-278679 entitled "METHOD OF RESISTANCE WELDING OF ARTICLES OF ALUMINUM OR SIMILAR MATERIALS" (hereinafter referred to as Prior Art C).

Prior Art A is directed to techniques of joining a pair of aluminum plates together by resistance welding with a thin zinc layer inserted between the respective weld surfaces of the plates. In this prior art, the zinc layer is instantly fused to provide locally a highly resistive portion in which current may be concentrated, causing a fused area to be increased and thus providing increased strength at the weld connection.

Prior Art B is directed to techniques of joining a pair of aluminum plates together by resistance welding with a thin Ti layer sandwitched between the mating weld portions or surfaces of the plates. In this prior art, since current concentrates in the Ti portion at which electrical conductivity is lower by 1-2 figures or orders than aluminum, sufficient Joule heat can be produced. Since the resulting Al—Ti compounds also produce a portion of high resistivity, high Joule heat will be provided. As a result, improved strength will be achieved at the weld connection.

The art described in Prior Art C is a method of joining a pair of aluminum plates together by resistance welding with a thin layer of material of low electrical conductivity sandwiched between the mating weld junctions of the plates. The operations and resulting merits of this art are the same as those of Prior Art A and B.

In each of Prior Art A–C, increased Joule heat is generated so that resistance welding can be effected efficiently. It also facilitates effective utilization of electrical current, thus reducing current consumption.

However, in the art described above, a large welding force is still required and an improvement is required in this respect. Further, since the heat required in the welding depends on the Joule heat, it is at present not possible to sufficiently lower the value of current required in resistance welding, though a slight reduction of current may be possible.

The present invention has been provided with a view to avoid the foregoing inconveniences or problems by the inventors hereto.

In the course of experiments to carry out resistance welding employing metal and metal oxide powders as inserts between the weld junctions of aluminum plates to be weld connected, the inventors have found that the more the metal and metal oxide powders are densely distributed as insert materials over the mating weld surfaces of the aluminum plates, the better the welding results will be. The reason for this is that the metal and metal oxide powders distributed in high density will produce a desirable conductive bridge.

One way of achieving such high density distribution of metal powders and metal oxide powders is to increase a welding force. However, this makes no improvement over the prior art.

To this end, the inventors have experimented with the use of metal powders and metal oxide powders presented in the form of paste by mixing in a fluidized resin and have observed a prospect for possible reduction of a welding force, which lead to the achievement of the invention.

It is therefore an object of the invention to provide improved resistance welding techniques for joining aluminum articles in which a small welding force and low current will be required to produce a weld connection or junction with desired strength.

SUMMARY OF THE INVENTION

According to its basic principle, the invention provides a powder material for use in resistance welding aluminum articles, which material is formed from mixing a given amount of a liquid resin and a given amount of a metal powder or a mixture of the metal powder with a given amount of a metal oxide powder.

In its basic principle, there is also provided a method of resistance welding aluminum articles in which a powder mixture is prepared by mixing a given amount of a liquid resin and a given amount of a metal powder or a mixture of the metal powder with a given amount of a metal oxide powder and is then inserted between the mating weld surfaces of the aluminum articles to be joined. The term "aluminum articles" used herein should be construed as a generic expression and represent not only such articles but also articles of aluminum alloys.

Specific forms of the invention are as given below.

In a first aspect of the invention, the powder material for use in resistance welding is comprised of a mixture of 10–50% by weight of epoxy resin and the remaining proportion of a magnesium powder or a mixture of magnesium and aluminum powders.

Use of a magnesium powder or a mixture of a magnesium and aluminum powders is to effect melting at a eutectic temperature, not at a melting point of each of the materials, which is generated by heating aluminum held in contact with magnesium. Stated otherwise, when magnesium or magnesium powder is inserted and energized for resistance welding, melting occurs at 437° C. which is lower than the melting point of aluminum, whereby it is possible to reduce the amount of heat required for forming a nugget (remains from solidification of molten metal) between the contact surfaces of the aluminum plates, this requiring a smaller value of weld current.

In a second aspect of the invention, the powder material for use in resistance welding is comprised of 10–50 percent by weight of an epoxy resin and less than 65 % by weight of a metal oxide powder, the rest being an aluminum powder or a magnesium powder, or both.

According to the second aspect, the powder material is imparted with a higher viscosity by adding epoxy resin so that it can be handled with ease. Also, by virtue of the presence of metal oxides, a thermit reaction may be facilitated to thereby provide higher heat at a weld junction, resulting in effective welding. The powder material also achieves crystallization of aluminum or magnesium based metal compounds, which provides added strength to the weld junction.

In a third aspect of the invention, there is provided a method of joining articles of aluminum alloys by resistance welding in which a pasty mixture is provided by mixing an aluminum powder or a magnesium powder, or both, with a metal oxide powder and adding a liquid resin such as an epoxy resin, and the mixture is interposed between the weld portions of the aluminum alloy articles to be joined.

According to the third aspect, a metal oxide powder and others, which are capable of generating a thermit reaction upon welding, are made to have a higher viscosity by addition of thermoplastic resins, and an effective conduction bridge can therefore be provided. By use of an epoxy resin, weld strength can also be improved, because the solidified resin will serve to suppress crack generation possible at the edges of the weld nugget.

The invention, in its fourth aspect, provides a method of resistance welding aluminum articles with a pasty mixture inserted between the mating weld surfaces of the articles to be welded, the pasty mixture being comprised of 10–50 percent by weight of a liquid resin having an initial viscosity between 0.1 Pa.s and 80 Pa.s and a metal powder having an electrical conductivity higher than that of aluminum.

In its fifth aspect, the invention provides a method of resistance welding aluminum articles with a pasty mixture interposed between the mating weld surfaces of the articles to be joined, the pasty mixture being comprised of 10–50 percent by weight of a liquid resin having an initial viscosity between 0.1 Pa.s and 80 Pa.s, a metal powder and a metal oxide powder forming the remaining portion.

According to the fourth and fifth aspects, resistance welding is conducted after the pasty mixture, produced from mixing a metal powder and a metal oxide powder in a liquid resin having the above mentioned viscosity, is inserted between the mating surfaces of the articles to be welded. As a result, the powder mixture may be distributed in high density over the surfaces with a lower welding force than normally required, leading to achievement of an excellent conduction bridge.

By employing, as the powder mixture to be distributed over the mating weld surfaces, materials with eutectic reaction capability which lower the melting point of aluminum or materials with thermit reaction capability, it is possible to effect melting in a low heating condition and to produce high heat with a low current. By such heat, it may also be possible to easily destroy the oxidation layer on the surfaces of the articles to be welded.

Accordingly, the invention enables provision of a weld junction with desired strength, requiring only a low current and a small welding force.

DETAILED DESCRIPTION OF THE PREFERRED EMBODIMENTS

The invention will now be described in more detail.

As described above, the invention, in its basic aspect, provides a powder material for use in resistance welding, which is comprised of a given amount of a liquid resin and a given amount of a metal powder or a mixture of the metal powder and a metal oxide powder.

In its basic aspect, the invention also provides a method of resistance welding aluminum articles in which a powder mixture is provided by mixing a given amount of a liquid resin with a given amount of a metal powder or with a mixture of the metal powder and a given amount of a metal oxide powder and inserted between the mating weld surfaces of the aluminum articles to be joined.

Specific embodiments of the invention will be described below.

The powder material provided according to the first aspect of the invention for resistance welding articles of aluminum alloy comprises 10–50 percent by weight of a liquid resin such as an epoxy resin and the remaining proportion of a magnesium powder or a mixture of the magnesium and aluminum powders.

In accordance with the invention, the powder material is formed by mixing 10–50 percent by weight of an epoxy resin with a magnesium powder or a mixed powder of magnesium and aluminum.

The reason for use of the magnesium powder or the mixed powder of magnesium and aluminum is that when aluminum and magnesium held in contact therewith are heated, melting occurs at a eutectic point thereof, not at their respective melting points.

In other words, when magnesium or a magnesium powder is inserted and energized upon resistance welding, melting occurs at 437° C. which is lower than the melting point of aluminum and this leads to reduction of the amount of heat required in forming a nugget and hence to a smaller current value.

By incorporation of the epoxy resin as explained above, it becomes possible to provide a stable conduction path since the epoxy resin may penetrate into the contact surfaces under a small welding force. As a result, a conduction bridge can be generated at the pressure center of an electrode, leading to reduction of areas with uneven weld strengths.

The binding action of the epoxy resin prevents scattering of the powder so that the powder may be handled with ease.

If the ratio of the epoxy resin is less than 10% by weight, the resultant viscosity may be insufficient, and if it is chosen to be over 50% by weight, then the conductivity may deteriorate. Thus, the ratio of the epoxy resin should fall within the range from 10% by weight to 50% by weight.

The second aspect of the invention is directed to a powder material for use in resistance welding articles of aluminum alloy, which comprises 10–50 wt % of a liquid resin such as an epoxy resin, less than 65% by weight of a metal oxide powder and the remaining proportion of an aluminum powder or a magnesium powder, or both.

In accordance with the second aspect, the powder mixture is obtained by mixing 10–50% by weight of a liquid resin such as an epoxy resin, less than 65% by weight of a metal oxide powder and the remaining proportion of an aluminum powder or a magnesium powder, or both. Due to incorporation of an epoxy resin, the powder is imparted with a higher viscosity so that it may be handled easily. Also, the metal oxide accelerates a thermit reaction which provides higher heat to a weld junction, thus leading to improved welds. With such arrangement, it is further possible to achieve crystallization of compounds of aluminum or magnesium based metals, which provides increased strength to the weld junction.

The third aspect of the invention is directed to a method of resistance welding aluminum articles wherein the powder materials according to the first and second aspects of the invention are applied. Specifically, before conducting resistance welding on aluminum articles, a pasty mixture is prepared by adding a liquid resin to a mixture of a metal oxide powder with an aluminum powder or a magnesium powder, or both, and then disposed between the mating weld portions of the aluminum articles to be joined.

In the third aspect, the liquid resin is preferably an epoxy resin. The mix ratio of the epoxy resin within the pasty mixture should preferably be in the range of 10–50% by weight.

thermit reaction upon welding, may be imparted with a higher viscosity, whereby a desired conduction bridge can be achieved.

In the embodiment just described, an epoxy resin is employed as the liquid resin, which solidifies after welding. The resuming solidification will serve to suppress crack generation possible at edges of the welding nugget, thus contributing to improvement of weld strength.

The results of implementations according to the first, second and third aspects of the invention will now be described below. The implementations are given for illustration only and should not be construed to limit the invention thereto.

The effects of epoxy resins and thermit reactions are indicated in Table 1 below. The effects of epoxy resins and magnesium inserts are shown in Table 2 below.

Hereunder, explanation will be given on the effects of the epoxy resins having reference to Table 1.

For understanding of the effects of the epoxy resins, Implementations 1–5 of the present invention and Comparative Example 1 will now be discussed.

Articles to be welded (base metals)

Material: Al—Mg Aluminum (A5182-JIS) roll plate

Plate thickness: 1.2 mm

Electrode

Model: R type

Electrode diameter: 16 mm

Radius of curvature of electrode tip: 80 mm

Material: nonoxygen copper

Welding conditions

Power supply: inverter type

Current: 12 kA

Welding force: as shown in Table 1 below

TABLE 1

| | | INSERT MATERIALS | | WELDING CONDITIONS | | | RESULTS |
|---|---|---|---|---|---|---|---|
| | KINDS | COAT AMOUNT (g) | COAT AREAS (mm²) | CURRENT (kA) | WELDING TIME (cycle) | WELDING FORCE (kgf) | TENSILE SHEAR LOAD (kgf) |
| Compa. Example 1 | NONE | 0 | 0 | 12 | 16 | 400 | 160 |
| Implementation 1 | 45 wt. % $MnO_2$ – 30 wt. % Mg – 25 wt. % epoxy resin | 0.25 | 900 | 12 | 16 | 100 | 292 |
| Implementation 2 | 45 wt. % $MnO_2$ – 30 wt. % Al – 25 wt. % epoxy resin | 0.25 | 900 | 12 | 16 | 100 | 289 |
| Implementation 3 | 45 wt. % $MnO_2$ – 25 wt. % Al – 30 wt. % epoxy resin | 0.25 | 900 | 12 | 16 | 100 | 268 |
| Implementation 4 | 45 wt. % $MnO_2$ – 7.5 wt. % Mg – 22.5 wt. % Al – 25 wt. % epoxy resin | 0.25 | 900 | 12 | 16 | 100 | 299 |
| Implementation 5 | 45 wt. % NiO – 7.5 wt. % Mg – 22.5 wt. % Al – 25 wt. % epoxy resin | 0.25 | 900 | 12 | 16 | 100 | 333 |

The epoxy resins are Epicoat 828 (brand name, initial viscosity: 14 Pa · s) commercially available from Yuka-Shell Co., Ltd.

According to the third aspect of the invention, upon performing resistance welding (spot welding) on the aluminum articles, a pasty mixture, prepared by adding a liquid resin, preferably an epoxy resin, to a mixture of an aluminum powder or a magnesium powder, or both, with a metal oxide powder, is disposed between the mating weld surfaces of the aluminum articles to be welded. As a result, the metal powder and others present in the mixture, which generate a Comparative Example 1 exhibits values obtained from direct spot welding of base metals without an insert therebetween. As shown, the resulted tensile shear load was only 160 kgf at maximum.

It should be noted that the given tensile shear strengths correspond to tensile forces required for a shear fracture and not to per unit area forces. The same applies to all Tables to be described below.

Implementation 1 exhibits the results obtained from a test on a mix or blend prepared by addition of an epoxy resin to the mixture of a metal oxide powder $MnO_2$ and a magnesium powder. The tensile shear load of 292 kgf was observed, which is a 132 kgf increase over that of Comparative Example 1.

Implementation 2 exhibits the data resulted from a test on a mixture prepared by adding an epoxy resin to the mixture of a metal oxide powder $MnO_2$ and an aluminum powder. The resultant tensile shear load is 289 kgf, and this is a 129 kgf increase over Compara. Ex. 1.

Implementation 3 shows the test results on a mixture prepared by addition of an epoxy resin to the mixture of a metal oxide powder $MnO_2$ and an aluminum powder. The tensile shear load of 268 kgf was observed, which is an increase of 108 kgf over Compara. Ex. 1.

Implementation 4 exhibits the results from a test on a mixture prepared by adding an epoxy resin to the mixture of a metal oxide powder $MnO_2$, a magnesium powder and an aluminum powder. The tensile shear load of 299 kgf resulted, which is an increase of 139 kgf over Compara. Ex. 1.

Implementation 5 exhibits the test results an a mixture prepared by addition of an epoxy resin to the mixture of a nickel oxide powder, a magnesium powder and an aluminum powder. The tensile shear load in this case was 333 kgf, a 173 kgf increase over Compara. Ex. 1.

As can be readily appreciated from the exhibited data, use of insert materials such as a metal oxide powder, an aluminum powder and a magnesium powder produces improved tensile shear load compared to a case where such insert materials are not used. By addition of an appropriate amount of epoxy resin to the insert materials, the tensile shear load may be further increased.

It may also be appreciated from the results of Table 1 that by incorporation of an epoxy resin, the welding force required at the weld portion was as small as 100 kgf, and this is only one fourth of the 400 kgf required in Compara. Ex. 1. The required welding force can thus be reduced significantly.

Where spot welding is performed with a welding force of 100 kgf but without any insert materials as in Compara. Ex. 1, the resultant tensile shear load will be dropped further down to about 100 kgf, resulting in an unevenly distributed weld strength.

In light of the results of Table 1, the following can readily be understood by one with ordinary knowledge in the art.

Implementations 1–5 of Table 1 establish that the resistance welding powder materials according to the invention produce excellent results.

Implementations 1–5 of Table 1 establish that the method of resistance welding according to the invention provide excellent results.

Implementations 1–5 of Table 1 establish that the inventive method of resistance welding employing a pasty mixture incorporating an epoxy resin as a liquid resin produce excellent results.

The merits of magnesium-based mixture inserts will now be explained having reference to Table 2 below.

With reference to Table 2, Implementations 6–9 and Comparative Examples 3 and 4 will be explained for full understanding of the results that can be produced by magnesium-based mixture inserts.

Articles to be welded (base metal)

Material: Al—Mg Aluminum alloy (JIS #A5182) roll plate

Plate thickness: 1.2 mm

Electrode

Type: R type

Electrode diameter: 16 mm

Radius of curvature of electrode tip: 80 mm

Material: nonoxygen copper

Welding conditions

Power supply; inverter system

Current: as shown in Table 2 below

Welding force: 400 kgf or 100 kgf

TABLE 2

| | | INSERT MATERIALS | | WELDING CONDITIONS | | | RESULTS |
|---|---|---|---|---|---|---|---|
| | KINDS | COAT AMOUNT (g) | COAT AREAS (mm$^2$) | CURRENT (kA) | WELDING TIME (cycle) | WELDING FORCE (kgf) | TENSILE SHEAR LOAD (kgf) |
| Compa. Example 3 | NONE | 0 | 0 | 12 | 16 | 400 | 160 |
| Implementation 6 | 10 wt. % epoxy resin + 48.6 wt. % Mg – 41.4 wt. % Al | 0.25 | 900 | 12 | 16 | 100 | 198 |
| Implementation 7 | 30 wt. % epoxy resin + 37.6 wt. % Mg – 32.2 wt. % Al | 0.25 | 900 | 12 | 16 | 100 | 224 |
| Implementation 8 | 50 wt. % epoxy resin + 27 wt. % Mg – 23 wt. % Al | 0.25 | 900 | 12 | 16 | 100 | 193 |
| Compa. Example 4 | 55 wt. % epoxy resin + 24.3 wt. % Mg – 20.7 wt. % Al | 0.25 | 900 | 12 | 16 | 100 | 158 |
| Implementation 9 | 40 wt. % epoxy resin + 60 wt. % Mg | 0.25 | 900 | 12 | 16 | 100 | 205 |

The epoxy resins are Epicoat 828 (brand name, initial viscosity: 14 Pa · s) commercially available from Yuka-Shell Co., Ltd.

Comparative Example 3 represents direct spot welding of base metals at a current value of 12 kA without using any insert materials. The tensile shear load was only 160 kgf.

In Implementations 6–8, the value of current was maintained the same, at 12 kA, and insert materials were used which contain 54% by weight of Mg of the combined Mg—Al powders and 10% by weight, 30% by weight or 50%, respectively, by weight of an epoxy resin. When the base metals were spot welded together with such insert materials sandwitched therebetween, the resultant tensile shear loads were 198 kgf, 224 kgf and 193 kgf, all being larger than 190 kgf.

Comparative Example 4 was conducted under the same conditions as in Implementation 8 except that 55% by weight of an epoxy resin was incorporated. Due to the excess amount of epoxy resin, the tensile shear load dropped to 158 kgf, which is far below 190 kgf.

Implementation 9 represents spot welding performed on base metals with the same current value, 12 kA, after insert materials containing 40% by weight of an epoxy resin and 60% by weight of Mg were inserted between the weld surfaces of the base metals. A tensile shear load of 206 kgf, higher than 190 kgf, was observed.

Table 2 thus illustrates that the resistance welding insert materials according to the first and second aspects of the invention produce excellent tensile shear loads at a low value of current.

As already explained, since the welding powder materials according to the first and second aspect of the invention are formed by mixing a given amount of epoxy resin, a given amount of metal oxides and magnesium powder or a powder mixture of magnesium and aluminum, a eutectic reaction occurs between magnesium and aluminum, lowering their melting point. Accordingly, less heat and hence lower current wilt be required for resistance welding.

Also, since the welding powder materials comprise a predetermined amount of epoxy resin, a predetermined amount of metal oxides and either aluminum powder or magnesium powder, they have a higher viscosity imparted by the epoxy resin, enabling easy handling thereof. Further, the metal oxides present therein accelerate a thermit reaction which provides a higher temperature to a weld portion, leading to enhanced weld quality. It is also possible to effect crystallization of aluminum or magnesium metal compounds, which will provide increased strength to the weld connection.

Upon resistance welding aluminum articles according to the third aspect of the invention, a pasty mixture is inserted between the mating weld surfaces of the articles, which is formed by mixing either aluminum powder or magnesium powder, or both, with metal oxide powder and adding liquid resin thereto. As a result, it is possible to impart a higher viscosity by use of thermoplastic resins with the metal oxide powder from which a thermit reaction results and other powders present, whereby an excellent conduction bridge can be retained.

Since epoxy resin is employed as the liquid resin, the epoxy resin will act to suppress crack generation possible at the nugget as it solidifies, thus contributing to strengthening of the weld connection.

The tensile shear strength indicated relative to the Implementation being described was taken before solidification of the epoxy resin. The strength should be higher after solidification of the epoxy resin.

A fourth aspect of the invention will now be described. Provided by this aspect is a method of resistance welding articles of aluminum with a pasty mixture inserted between the mating weld surfaces of the aluminum articles, the pasty mixture being comprised of 10–50 percent by weight of liquid resin having an initial viscosity larger than 0.1 Pa.s and smaller than 80 Pa.s and more than one type of metal powder having electrical resistivity higher than that of aluminum.

According to a fifth aspect of the invention, there is provided a method of resistance welding aluminum articles with a pasty mixture placed at the weld junction between the mating weld surfaces of the articles, the pasty mixture being comprised of 10–50 percent by weight of liquid resin having an initial viscosity higher than 0.1 Pa.s and lower than 80 Pa.s, metal powder and metal oxide powder.

In the fourth and fifth aspects of the invention, the liquid resin may be any room-temperature-setting resin. Such room-temperature-setting resin is liquid in its original form and solidifies when placed in an atmospheric condition. Therefore, the resin must be mixed with metal powder and others required while it is still in its liquid form, for use as an insert in the subsequent welding.

Preferably, the room-temperature-setting resin as described above includes at least one kind of resin selected from the group consisting of acrylic resins, nitrile resins, urethane resins silicone resins and polyester resins.

The above-mentioned metal powders should preferably include at least one powder element selected from the group consisting of Mg (magnesium), Zn (zinc) and Si (silicon), even though silicon is non-metallic itself, each being capable of coacting with aluminum to produce a eutectic reaction.

One powder element forming the above-described powders is aluminum and the remainder is at least one powder element selected from tie group consisting of Ni (nickel), Cu (copper), Mn (manganese), Zr (zirconium), Ti (titanium), Cr (chromium) and Co (cobalt), each being capable of developing a self-exothermic or self-heating reaction.

In a case where a powder mixture of metal powder and metal oxide powder is used, if the metal powder includes at least one element selected from the group consisting of aluminum, Mg (magnesium), and Zr (zirconium), the metal oxide should preferably include at least one element selected from the group consisting of $MnO_2$, $Cr_2O_3$, $TiO_2$, $SiO_2$, $Fe_2O_3$ and CuO.

When Ti (titanium) is chosen as the metal powder, the metal oxide should preferably include at least one element selected from the group consisting of $MnO_2$, $Cr_2O_3$, $SiO_2$, $Fe_2O_3$ and CuO.

If Si (silicon) is selected as the metal powder, the metal oxide should preferably include at least one element selected from the group consisting of $MnO_2$, $Cr_2O_3$, $TiO_2$, $Fe_2O_3$ and CuO.

When performing resistance welding, if a pasty mixture, obtained by adding metal powder and/or metal oxide powder to liquid having a moderate initial viscosity, is placed between the weld surfaces of the articles to be welded, it is possible to cause the mixed powders to be distributed in high density over the surfaces with a smaller welding force than normally required since the pasty mixture has moderate liquidity, thus providing an excellent conduction bridge.

Since the mixed powders distributed over the weld surfaces are such materials that may exhibit a eutectic reaction which lowers the melting point of aluminum or such materials that generate a thermit reaction, they can be melted easily with low heat and to produce high heat with low current. By such generated heat, it is also possible to easily destroy the oxidation layers on the surfaces of the articles to be welded.

Consequently, the method according to the fourth and fifth aspect of the invention can achieve the desired weld strength with a low current and a small welding force.

If the viscosity of the liquid resin is extremely low, the separation of the powders from the resin and their deposition begins at an early stage, thus deteriorating operational easiness and reliability thereof. Therefore, it is preferred that the resin has an initial viscosity higher than 0.1 Pa.s. If the liquid resin has an extremely high viscosity, the amount of added powder within the insert materials may be insufficient. Therefore, it is preferred that the resin has an initial viscosity lower than 80 Pa.s.

In case the mixed powders (metal powder, metal oxide powder) to be mixed with the liquid resin are less than 50 percent by weight, uneven distribution of the powders may arise when placed as the insert materials between the weld surfaces and pressed with a small welding force. This is unacceptable, because little heat may be generated at portions having little powders. If the added powder amount exceeds 90 percent by weight, the viscosity of the pasty mixture may be insufficient, resulting in deteriorated operational easiness.

Therefore, it is desired that the ratio of the mixed powders is in the range of 50–90 percent by weight and the ratio of the liquid resin is in the range of 10–50 percent by weight.

The liquid resin may be any room-temperature-setting resin. By leaving the insert materials as they are for a few days after welding, it solidifies and no operation will be required after welding. Silicone resins, for example, solidify in about three days. In contrast, thermally solidifying resins require thermal treatments, leading to increased production costs.

As such room-temperature-setting resins, acrylic resins, nitrile resins, urethane resins, silicone resins and polyester resins are preferred. Of these, acrylic resins may provide high weld strength.

Table 3 below shows elements which coact with aluminum to exhibit a eutectic reaction, and eutectic temperatures.

TABLE 3

| EUTECTIC REACTION ELEMENTS | EUTECTIC TEMPERATURES |
|---|---|
| Mg | 437° C. |
| Zn | 381° C. |
| Si | 577° C. |

Listed in Table 4 below are elements which are capable of developing a self-exothermic reaction, and their heating temperatures. The reaction heat of such elements will be applied to fusing of the weld surfaces of the aluminum articles, providing improved weld strength and enabling reduction of required current.

TABLE 4

| SELF-EXOTHERMIC REACTION ELEMENTS | SELF-HEATING TEMPERATURES |
|---|---|
| Ni | 1,200° C. |
| Cu | 1,100° C. |
| Mn | 1,400° C. |
| Zr | 2,000° C. |
| Ti | 1,800° C. |
| Cr | 2,000° C. |
| Co | 1,700° C. |

Table 5 below shows the mixed powders (Al, Mg, Zr) and the results of the relevant thermit reactions. Since the heat generated in the thermit reactions is applied to the fusing of the weld surfaces of the aluminum articles, improved strength may be imparted to the weld connection and the required current may be reduced.

When Zr is included in the mixed powders, $ZrO_2$ generated in the thermit reaction will produce a secondary thermit reaction with respect to the (aluminum) articles to be welded, whereby the sum of reaction heats will become larger than that shown in Table 5.

Ti, Si and Ci generated through the reaction develop a triturating effect with respect to matrix aluminum, thus providing added strength to the fused portion (nugget).

TABLE 5

| MIXED POWDERS/THERMIT REACTIONS | AMOUNT OF GENERATED HEAT Q (cal/g) |
|---|---|
| $3/2SiO_2 + 2Al \to Al_2O_3 + 3/2Si + 71$ Kcal | 493 |
| $Cr_2O_3 + 2Al \to Al_2O_3 + 2Cr + 125$ Kcal | 609 |
| $3/2TiO_2 + 2Al \to Al_2O_3 + 3/2Ti + 59$ Kcal | 340 |
| $3/2MnO_2 + 2Al \to Al_2O_3 + 3/2Mn + 212$ Kcal | 1147 |
| $Fe_2O_3 + 2Al \to Al_2O_3 + 2Fe + 201$ Kcal | 940 |
| $3CuO + 2Al \to Al_2O_3 + 3Cu + 285$ Kcal | 975 |
| $1/2MnO_2 + Mg \to MgO + 1/2Mn + 80.4$ Kcal | 1186 |
| $MnO_2 + Zr \to ZrO_2 + Mn + 137.9$ Kcal | 774 |

Table 6 below shows the mixed powders (Ti, Si) and the results of the relevant thermit reactions. Since the heat generated in the thermit reactions is applied to the fusing of the weld surfaces of the aluminum articles, improved strength can be imparted to the weld connection and the required current can be reduced.

$TiO_2$ and $SiO_2$ generated in the thermit reaction will produce a secondary thermit reaction with respect to the (aluminum) articles to be welded, whereby the sum of generated heat will become larger than that shown in Table 6.

TABLE 6

| MIXED POWDERS/THERMIT REACTIONS | AMOUNT OF GENERATED HEAT (cal/g) |
|---|---|
| $MnO_2 + Ti \to TiO_2 + Mn + 101.4$ Kcal | 752 |
| $MnO_2 + Si \to SiO_2 + Mn + 93.4$ Kcal | 811 |

Hereinafter, the fourth and fifth aspects of the invention will be described. It should be noted that the invention may not be restricted to the illustrated Implementations.

The Implementations and Comparative Examples to be described have been performed based on what are listed in Table 7 that follows.

TABLE 7

| ARTICLES TO BE WELDED (BASE METALS): | |
|---|---|
| Material: | aluminum material (A5182-JIS) |
| Dimension: | 100 mm × 30 mm × 1.2 mm |
| WELDING MACHINE: | inverter type |
| Electrode Type: | R type |
| Electrode Diameter: | 16 mm |
| Radius of Curvature of Electrode Tip: | 80 mm |
| Material of Electrode: | nonoxygen copper |
| WELDING CONOITIONS: | |
| Welding Current: | 16 kA |
| Welding Time: | 15 cycles |
| Welding Force: | separately indicated |

Referring to Table 8, implementations 10–12 and Comparative Examples 5 and 6 will now be discussed.

TABLE 8

| | INSERT | | | | | | | WELD. CONDIT. | | EVALU- |
|---|---|---|---|---|---|---|---|---|---|---|
| | LIQUID | MATERIALS | | METAL POWDERS/METAL OXIDES | | | | | Tensile | |
| | RESINS Kinds | Initial Viscosity | Mix Ratios | Compositions | Mix Ratios | Quantity | Areas | Weld'g Force | Shear Strength | ATION Judgment |
| Implem. 10 | epoxy Epicoat 807 | 4 Pa · s | 40 wt. % | 3MnO$_2$—34Mg—23Al | 60 wt. % | 0.25 g | 900 mm$^2$ | 250 kgf | 265 kgf | OK |
| Implem. 11 | epoxy Epicoat 828 | 14 Pa · s | 40 wt. % | 3MnO$_2$—34Mg—23Al | 60 wt. % | 0.25 g | 900 mm$^2$ | 250 kgf | 256 kgf | OK |
| Implem. 12 | epoxy Araidite XNR3303 + diluent EPT016 (3%) | 80 Pa · s | 45 wt. % | 2.75MnO$_2$—31.35Mg—20.9Al | 55 wt. % | 0.25 g | 900 mm$^2$ | 250 kgf | 230 kgf | OK |
| Compara. Example 5 | epoxy Araidite XNR3303 | 100 Pa · s | 50 wt. % | 2.5MnO$_2$—28.5Mg—19Al | 50 wt. % | 0.25 g | 900 mm$^2$ | 250 kgf | 195 kgf | NO |
| Compara. Example 6 | epoxy Araidite XNR3551 | 400 Pa · s | 60 wt. % | 2MnO$_2$—23Mg—15Al | 40 wt. % | 0.25 g | 900 mm$^2$ | 250 kgf | 172 kgf | NO |

In Implementation 10, an epoxy resin, Epicoat 807 (brand name), having an initial viscosity of 4 Pa.s was used as the liquid resin, and the mixed powders included 3MnO$_2$-34Mg-23Al. The coefficients (3, 34, 23) affixed to the powder composition represent percent by weight. Accordingly, the mix ratio of the powders in the insert material is 60% by weight, the remaining 40% by weight being the mix ratio of the liquid resin. This applies to all mix ratio calculations hereinafter.

After 0.25 g of the insert material thus composed was inserted between a pair of aluminum articles for an area of 900 mm$^2$, resistance welding was performed applying a welding force of 250 kgf thereto.

The resultant tensile shear strength of the welded materials was 265 kgf. The value obtained by conversion of the strength required on such kind of aluminum materials by JIS (Japan industrial Standards) is about 200 kgf. The value obtained in Implementation 10 exceeded 200 kgf, and its evaluation is therefore "OK".

Implementation 11 was carried out under the same conditions as in Implementation 10, except that an epoxy resin, Epicoat 828 (brand name), having an initial viscosity of 14 Pa.s was used as the liquid resin.

The welded materials showed the tensile shear strength of 256 kgf, which is well above 200 kgf, and hence its evaluation is "OK".

Implementation 12 was performed employing a mixture of an epoxy liquid resin called Araldite XNR3303 (brand name) having an initial viscosity of 80 Pa.s and 3% of diluent called EPT016 (brand name), and 2.75MnO$_2$-31.35Mg-20.9Al as mixed powders. The mix ratio of the mixed powders in the insert material is 55% by weight, the remaining 45% by weight being the mix ratio of the liquid resin.

The resultant tensile shear strength of the welded materials was 230 kgf, which is in excess of 200 kgf, and its evaluation is therefore "OK".

Comparative Example 5 was performed employing an epoxy liquid resin called Araldite XNR3303 (brand name) having an initial viscosity of 100 Pa.s and 2.5MnO$_2$-28.5Mg-19Al as mixed powders. The mix ratio of the powders in the insert material is 50% by weight, the remaining 50% by weight being the mix ratio of the liquid resin.

After 0.25 g of the insert material thus prepared was placed between a pair of aluminum articles for an area of 900 mm$^2$, resistance welding was performed applying a welding force of 250 kgf thereto.

The resultant tensile shear strength of the welded materials was 195 kgf, which is below 200 kgf. Accordingly, its evaluation is "NO".

Comparative Example 6 was performed employing an epoxy liquid resin called Araldite XNR3551 (brand name) having an initial viscosity of 400 Pa.s and 2MnO$_2$-23Mg-15Al as mixed powders. The mix ratio of the powders in the insert material is 40% by weight, the remaining 60% by weight being the mix ratio of the liquid resin.

After 0.25 g of the insert material thus prepared was placed between a pair of aluminum articles for an area of 900 mm$^2$, resistance welding was performed applying a welding force of 250 kgf thereto.

The resultant tensile shear strength of the welded materials was 172 kgf, which is below 200 kgf, and its evaluation is "NO" accordingly.

As can be seen from the above, it is not possible to provide desired strength to a weld junction when an initial viscosity is over 100 Pa.s.

Referring to Table 9 below, Implementations 13–20 and Comparative Examples 7 and 8 will now be discussed.

In Table 9, "NS Seal E" (with carbons omitted) (brand name) commercially available from Nogawa Chemical was used as a silicone resin. Used as an acrylic resin is "SG350" (brand name) provided by Nogawa Chemical. As a nitrile resin, Nogawa Chemical's No. "1880A" (brand name) was used. Nogawa Chemicals "DU418" (brand name) was used as a urethane resin. As a polyester resin, Nogawa Chemical's "DA3080B" (brand name) was used. Used as an epoxy resin were Yuka-Shell's "807" (brand name) and "828" (brand name) and Japan Chiba Gelgle's "3303" (brand name) and "3551" (brand name).

No hardeners but only main agents were used upon mixing the powders in the acrylic resin and polyester resin.

TABLE 9

| | INSERT | | | | | | | WELD. CONDIT. | | |
|---|---|---|---|---|---|---|---|---|---|---|
| | LIQUID | MATERIALS | | METAL POWDERS/METAL OXIDES | | | | | Tensile | EVALU- |
| | RESINS Kinds | Initial Viscosity | Mix Ratios | Compositions | Mix Ratios | Quantity | Areas | Weld'g Force | Shear Strength | ATION Judgment |
| Compara. Example 7 | none | | | none | | 0 g | 0 mm² | 400 kgf | 160 kgf | OK |
| Compara. Example 8 | none | | | none | | 0 g | 0 mm² | 250 kgf | 110 kgf | NO |
| Implem. 13 | silicone resin | 33 Pa · s | 30 wt. % | 49MnO₂—21Ti | 70 wt. % | 0.25 g | 900 mm² | 250 kgf | 223 kgf | OK |
| Implem. 14 | silicone resin | 33 Pa · s | 30 wt. % | 49Cr₂O₃—21Mg | 70 wt. % | 0.25 g | 900 mm² | 250 kgf | 225 kgf | OK |
| Implem. 15 | silicone resin | 33 Pa · s | 35 wt. % | 6MnO₂—39Al—20Ti | 65 wt. % | 0.25 g | 900 mm² | 250 kgf | 220 kgf | OK |
| Implem. 16 | silicone resin | 33 Pa · s | 35 wt. % | 6.5MnO₂—39Mg—19.5Al | 65 wt. % | 0.25 g | 900 mm² | 250 kgf | 260 kgf | OK |
| Implem. 17 | nitrile resin | 5 Pa · s | 35 wt. % | 6.5MnO₂—39Mg—19.5Al | 65 wt. % | 0.25 g | 900 mm² | 250 kgf | 222 kgf | OK |
| Implem. 18 | urethane resin | 5 Pa · s | 35 wt. % | 6.5MnO₂—39Mg—19.5Al | 65 wt. % | 0.25 g | 900 mm² | 250 kgf | 230 kgf | OK |
| Implem. 19 | acrylic resin | 14 Pa · s | 35 wt. % | 6.5MnO₂—39Mg—19.5Al | 65 wt. % | 0.25 g | 900 mm² | 250 kgf | 213 kgf | OK |
| Implem. 20 | polyester resin | 1 Pa · s | 35 wt. % | 6.5MnO₂—39Mg—19.5Al | 65 wt. % | 0.25 g | 900 mm² | 250 kgf | 220 kgf | OK |

Comparative Example 7 represents the results of resistance welding performed without any insert material but with an increased welding force of 400 kgf. The tensile shear strength of 160 kgf was below 200 kgf, and hence its evaluation is "NO".

Comparative Example 8 represents the results of resistance welding performed without any insert material but with a welding force of 250 kgf. The tensile shear strength of 110 kgf was again below 200 kgf. The evaluation here is also "NO".

Implementation 13 was performed employing as a liquid resin a silicone resin having an initial viscosity of 33 Pa.s and 49MnO₂-21Ti as mixed powders. The mix ratio of the powders in the insert material is 70% by weight, the remaining 30% by weight being the mix ratio of the liquid resin.

After 0.25 g of the insert material thus prepared was placed between a pair of aluminum articles for an area of 900 mm², resistance welding was conducted while applying a welding force of 250 kgf thereto.

The observed tensile shear strength 223 kgf of the welded materials was above 200 kgf. The evaluation here is "OK".

Implementation 14 was performed employing as a liquid resin a silicone resin having an initial viscosity of 33 Pa.s and 49Cr₂O₃-21 Mg as mixed powders. The mix ratio of the powders in the insert material is 70% by weight, the remaining 30% by weight being the mix ratio of the liquid resin. Other conditions were the same as in Implementation 13.

The obtained tensile shear strength of 223 kgf of the welded materials was above 200 kgf, which is evaluated to be "OK".

Implementation 15 was performed employing as a liquid resin a silicone resin having an initial viscosity of 33 Pa.s and 6MnO₂-39Al-20Ti as mixed powders. The mix ratio of the powders in the insert material is 65% by weight, the remaining 35% by weight being the mix ratio of the liquid resin. Other conditions were the same as in Implementation 13.

The obtained tensile shear strength of the welded materials was 220 kgf, which is above 200 kgf and hence evaluated to be "OK".

Implementation 16 was performed employing as a liquid resin a silicone resin having an Initial viscosity of 33 Pa.s and 6.5MnO₂-39Mg-19.5Al as mixed powders. The mix ratio of the powders in the insert material is 65% by weight, the remaining 35% by weight being the mix ratio of the liquid resin. Other conditions were the same as in Implementation 13.

The obtained tensile shear strength of the welded materials was 260 kgf, which is above 200 kgf and hence evaluated to be "OK".

Implementation 17 was performed employing as a liquid resin a nitrile resin having an initial viscosity of 5 Pa.s and 65MnO₂-39Mg-19.5Al as mixed powders. The mix ratio of the powders in the insert material is 65% by weight, the remaining 35% by weight being the mix ratio of the liquid resin. Other conditions were the same as in implementation 13.

The obtained tensile shear strength of the welded materials was 222 kgf, which is above 200 kgf and hence evaluated to be "OK".

Implementation 18 was performed employing as a liquid resin a urethane resin having an initial viscosity of 5 Pa.s and 6.5MnO₂-39Mg-19.5Al as mixed powders. The mix ratio of the powders in the insert material is 65% by weight, the remaining 35% by weight being the mix ratio of the liquid resin. Other conditions were the same as in Implementation 13.

The obtained tensile shear strength of the welded material was 230 kgf, which is above 200 kgf and hence evaluated to be "OK".

Implementation 19 was performed employing as a liquid resin an acrylic resin having an initial viscosity of 14 Pa.s and 6.5MnO₂-39Mg-19.5Al as mixed powders. The mix ratio of the powders in the insert material is 65% by weight, the remaining 35% by weight being the mix ratio of the liquid resin. Other conditions were the same as in Implementation 13.

The obtained tensile shear strength of the welded materials was 213 kgf, which is above 200 kgf and hence evaluated to be "OK".

Implementation 20 was performed employing as a liquid resin a polyester resin having an initial viscosity of 1 Pa.s and 6.5MnO$_2$-39Mg-19.5Al as mixed powders. The mix ratio of the powders in the insert material is 65% by weight, the remaining 35% by weight being the mix ratio of the liquid resin. Other conditions were the same as in Implementation 13.

The obtained tensile shear strength of the welded materials was 220 kgf, which is above 200 kgf and hence evaluated to be "OK".

Implementations 21–24 and Comparative Example 9 will now be discussed having reference to Table 10.

Pa.s and 4MnO$_2$-24Mg-12Al as mixed powders. The mix ratio of the powders in the insert material is 40% by weight, the remaining 60% by weight being the mix ratio of the liquid resin. Other conditions were the same as in Implementation 13.

The obtained tensile shear strength of the welded materials was 173 kgf, which is below 200 kgf and hence evaluated to be "NO".

Accordingly, it has been found undesirable that the mix ratio of the liquid resin in the insert material does not exceed 50% by weight.

TABLE 10

| | INSERT | | | | | | WELD. CONDIT. | | |
|---|---|---|---|---|---|---|---|---|---|
| | LIQUID | MATERIALS | | METAL POWDERS/METAL OXIDES | | | | Tensile | |
| | RESINS Kinds | Initial Viscosity | Mix Ratios | Compositions | Mix Ratios | Quantity | Areas | Weld'g Force | Shear Strength | EVALUATION Judgment |
| Implem. 21 | silicone resin | 33 Pa · s | 40 wt. % | 36Mg—24Al | 60 wt. % | 0.25 g | 900 mm$^2$ | 250 kgf | 222 kgf | OK |
| Implem. 22 | silicone resin | 33 Pa · s | 40 wt. % | 60Ni | 60 wt. % | 0.25 g | 900 mm$^2$ | 250 kgf | 216 kgf | OK |
| Implem. 23 | silicone resin | 33 Pa · s | 40 wt. % | 60Ti | 60 wt. % | 0.25 g | 900 mm$^2$ | 250 kgf | 216 kgf | OK |
| Implem. 24 | silicone resin | 33 Pa · s | 50 wt. % | 5MnO$_2$—30Mg—15Al | 50 wt. % | 0.25 g | 900 mm$^2$ | 250 kgf | 218 kgf | OK |
| Compara. Example 9 | silicone resin | 33 Pa · s | 60 wt. % | 4MnO$_2$—24Mg—12Al | 40 wt. % | 0.25 g | 900 mm$^2$ | 250 kgf | 173 kgf | NO |

Implementation 21 was performed employing as a liquid resin a silicone resin having an initial viscosity of 33 Pa.s and 36Mg-24Al as mixed powders. The mix ratio of the powders in the insert material is 60% by weight, the remaining 40% by weight being the mix ratio of the liquid resin. Other conditions were the same as in Implementation 13.

The obtained tensile shear strength of the welded materials was 222 kgf, which is above 200 kgf and hence evaluated to be "OK".

Implementation 22 was performed employing as a liquid resin a silicone resin having an initial viscosity of 33 Pa.s and 60Ni as mixed powders. The mix ratio of the powders in the insert material is 60% by weight, the remaining 40% by weight being the mix ratio of the liquid resin. Other conditions were the same as in Implementation 13.

The obtained tensile shear strength of the welded materials was 216 kgf, which is above 200 kgf and hence evaluated to be "OK".

Implementation 23 was performed employing as a liquid resin a silicone resin having an initial viscosity of 33 Pa.s and 60Ti as mixed powders. The mix ratio of the powders in the insert material is 60% by weight, the remaining 40% by weight being the mix ratio of the liquid resin. Other conditions were the same as in Implementation 13.

The obtained tensile shear strength of the welded materials was 216 kgf, which is above 200 kgf and hence evaluated to be "OK".

Implementation 24 was performed employing as a liquid resin a silicone resin having an initial viscosity of 33 Pa.s and 5MnO$_2$-30Mg-15Al as mixed powders. The mix ratio of the powders in the insert material is 50% by weight, the remaining 50% by weight being the mix ratio of the liquid resin. Other conditions were the sane as in Implementation 13.

The obtained tensile shear strength of the welded materials was 218 kgf, which is above 200 kgf and hence evaluated to be "OK".

Comparative Example 9 was performed employing as a liquid resin a silicone resin having an initial viscosity of 33

The fourth and fifth aspects of the invention and the related, detailed embodiments thus far explained provide the following advantages.

Since welding was performed with a pasty mixture inserted between the weld surfaces of the articles to be weld connected, which is comprised of 10–50% by weight of a liquid resin having an initial viscosity higher than 0.1 Pa.s and lower than 80 Pa.s and, as the remaining part, at least one metal powder having an electrical resistivity higher than that of aluminum, it may be ensured that the powder mixture is distributed in high density over the weld surfaces of the articles, with a relatively small welding force due to the moderate fluidity of the pasty mixture. As a result, an excellent conduction bridge can be provided.

It is also possible to generate a large Joule heat, because the metal powder has an electrical resistivity higher than that of aluminum.

Accordingly, by the method of the invention, required strength can be provided to the weld connection or junction with a low current and a small welding force.

Since welding was performed with a pasty mixture inserted between the weld surfaces of the articles to be weld connected, which is comprised of 10–50% by weight of a liquid resin having an initial viscosity higher than 0.1 Pa.s and lower than 80 Pa.s and, as the remaining part, a mixture of a metal powder and a metal oxide powder, desired weld strength can be achieved with a relatively low current and small welding force, as in the embodiment described above.

By employing a room-temperature-setting resin as the liquid resin, the heat treatment after welding can be avoided. In a case where a thermosetting resin is used as the liquid resin, a heat treatment is inevitable, leading to increased production costs. In the invention, since such heat treatment is not required, it is possible to achieve a cost reduction.

Since the room-temperature-setting resin may be at least one selected from the group consisting of an acrylic resin, nitrile resin, urethane resin, silicone resin and a polyester resin, it is possible to save time in determining the liquid resin and to render the involved operations easy.

Also, since the metal powder may be at least one chosen from several elements capable of eutectic reaction with aluminum, it is possible to produce desired weld strength with a low current.

Since the metal powder may be at least one chosen from the group consisting of Mg (magnesium), Zn (zinc) and Si (silicon), it is possible to save time in selecting metal powders and to make welding operations easy.

The metal powder may be two or more elements capable of exhibiting a self-exothermic reaction. As a result, the reaction heats may be applied to melting of the weld surfaces of the aluminum articles, whereby the weld connection strength can be improved and the required current can be reduced.

Of the two elements with self-exothermic reaction capability, one may be aluminum and the other may be at least one element selected from the group consisting of Ni (nickel), Cu (copper), Mn (manganese), Zr (zirconium), Ti (titanium), Cr (chromium) and Co (cobalt). In consequence, it is possible to perform the element selection operation easily and welding operations efficiently.

The metal powder may be at least one selected from the group consisting of aluminum, Mg (magnesium) and Zr (zirconium), and the metal oxide powder may be at least one selected from the group consisting of $MnO_2$, $Cr_2O_3$, $TiO_2$, $SiO_2$, $Fe_2O_3$ and CuO. In consequence, the operations of selecting the metal and metal oxide powders become easy, rendering the welding operations efficient.

Since the metal powder may be Ti (titanium) and the metal oxide powder may be at least one selected from the group consisting of $MnO_2$, $Cr_2O_3$, $SiO_2$, $Fe_2O_3$ and CuO, it is possible to make the operations to select the metal and metal oxide powders and hence to make the welding operations efficient.

The metal powder may be Si (silicon) and the metal oxide powder may be at least one selected from the group consisting of $MnO_2$, $Cr_2O_3$, $TiO_2$, $Fe_2O_3$ and CuO. As a result, it is possible to make the operations to select the metal and metal oxide powders and hence to make the welding operations efficient.

Once given the above disclosure, many other features, modifications and improvements will become manifest to the skilled artisan. Such other modifications, features and improvements are, therefore, considered a part of this invention, the scope of which is to be determined by the following claims.

What is claimed is:

1. A material for use in resistance welding articles of aluminum, comprising a spreadable pasty mixture of 10–50% by weight of a liquid resin, 2–65% by weight of a metal oxide powder and the remaining proportion of at least one of either an aluminum powder or a magnesium powder, or both;

wherein said liquid resin has an initial viscosity larger than 0.1 Pa.s and smaller than 80 Pa.s, and said metal oxide powder and aluminum or magnesium powder, or both, have an electrical resistivity higher than the electrical resistivity of aluminum, and said pasty mixture being inserted between the mating surfaces of said aluminum articles.

2. A method of resistance welding articles of aluminum, comprising the steps of preparing a pasty mixture by adding a liquid resin to a blend of a metal oxide powder with at least one of either an aluminum powder or a magnesium powder, or both, and inserting said pasty mixture between the mating weld surfaces of said aluminum articles.

3. A method of resistance welding articles of aluminum according to claim 2, wherein said liquid resin comprises an epoxy resin amounting to 10–50% by weight of said pasty mixture.

4. A method of resistance welding articles of aluminum, comprising the steps of preparing a pasty mixture by mixing 10–50% by weight of a liquid resin having an initial viscosity larger than 0.1 Pa.s and smaller than 80 Pa.s, with the remaining proportion of a metal powder and 2–65% by weight of a metal oxide powder, inserting said pasty mixture between the mating weld surfaces of said aluminum articles, and causing said pasty mixture to spread over the mating weld surfaces by imparting a pressure on said pasty mixture, through said aluminum articles, by welding electrodes engaging said aluminum articles at the time of the resistance welding.

5. A method of resistance welding articles of aluminum according to claim 4, wherein said liquid resin comprises a room-temperature-setting resin in the from of liquid at the time of welding.

6. A method of resistance welding articles of aluminum according to claim 5, wherein said room-temperature-setting resin comprises at least one selected from a group consisting of an acrylic resin, a nitrile resin, a urethane resin, a silicone resin and a polyester resin.

7. A method of resistance welding articles of aluminum according to claim 4, wherein said metal powder comprises at least one selected from a group consisting of aluminum, Mg and Zr powders and wherein said metal oxide powder comprises at least one selected from the group consisting of $MnO_2$, $Cr_2O_3$, $TiO_2$, $SiO_2$, $Fe_2O_3$ and CuO powders.

8. A method of resistance welding articles of aluminum according to claim 4, wherein said metal powder comprises a Ti powder and wherein said metal oxide powder comprises at least one selected from a group consisting of $MnO_2$, $Cr_2O_3$, $SiO_2$, $Fe_2O_3$ and CuO powders.

9. A method of resistance welding articles of aluminum according to claim 4, wherein said metal powder comprises a Si powder and wherein said metal oxide powder comprises at least one selected from a group consisting of $MnO_2$, $Cr_2O_3$, $TiO_2$, $Fe_2O_3$ and CuO powders.

* * * * *